（12） United States Patent
Tashiro et al.

(10) Patent No.: US 9,223,119 B2
(45) Date of Patent: Dec. 29, 2015

(54) ZOOM LENS AND IMAGE PICKUP APPARATUS HAVING THE SAME

(71) Applicant: CANON KABUSHIKI KAISHA, Tokyo (JP)

(72) Inventors: Yoshihisa Tashiro, Nikko (JP); Yasuaki Hagiwara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 13/684,747

(22) Filed: Nov. 26, 2012

(65) Prior Publication Data

US 2013/0162884 A1 Jun. 27, 2013

(30) Foreign Application Priority Data

Dec. 21, 2011 (JP) ................. 2011-279587

(51) Int. Cl.
*G02B 27/64* (2006.01)
*G02B 15/24* (2006.01)
*G02B 15/14* (2006.01)
*G02B 15/22* (2006.01)
*G02B 15/177* (2006.01)

(52) U.S. Cl.
CPC .............. *G02B 15/14* (2013.01); *G02B 15/177* (2013.01); *G02B 15/22* (2013.01); *G02B 27/646* (2013.01)

(58) Field of Classification Search
CPC ........ B02B 15/00; B02B 15/14; B02B 15/15; B02B 15/177; B02B 15/20; B02B 15/22; B02B 27/64; B02B 27/646
USPC ......................................... 359/676, 684, 686
See application file for complete search history.

(56) References Cited

U.S. PATENT DOCUMENTS

| 5,329,401 | A | * | 7/1994 | Sato | 359/686 |
| 6,101,042 | A | * | 8/2000 | Sato | 359/684 |
| 6,618,198 | B1 | * | 9/2003 | Endo | 359/557 |
| 7,333,273 | B2 | * | 2/2008 | Sensui | 359/686 |
| 7,382,550 | B2 | | 6/2008 | Nishimura | |
| 7,382,551 | B2 | | 6/2008 | Sekita | |
| 7,443,599 | B2 | | 10/2008 | Kohno et al. | |
| 7,443,604 | B2 | | 10/2008 | Nishimura | |
| 7,777,967 | B2 | | 8/2010 | Hirakawa | |
| 8,873,145 | B2 | | 10/2014 | Imaoka | |
| 8,947,562 | B2 | | 2/2015 | Ozaki | |

(Continued)

FOREIGN PATENT DOCUMENTS

JP 11-174329 A 7/1999
JP 2001-343584 A 12/2001

(Continued)

*Primary Examiner* — Thong Nguyen
(74) *Attorney, Agent, or Firm* — Fitzpatrick, Cella, Harper & Scinto

(57) ABSTRACT

A zoom lens includes a first lens unit having a negative refractive power, a second lens unit having a positive refractive power, a third lens unit having a negative refractive power, and a fourth lens unit having a positive refractive power, disposed in order from an object side to an image side, and an aperture stop between a lens surface closest to the object side of the second lens unit and a lens surface closest to the object side of the third lens unit, the third lens unit is moved to the image side during a focusing operation from an infinite object to a short distance object, the first lens unit is configured by at most two negative lenses and one positive lens, the third lens unit is configured by a single lens or a cemented lens, and an appropriate conditional expression are met.

12 Claims, 7 Drawing Sheets

(56) References Cited

U.S. PATENT DOCUMENTS

| | | |
|---|---|---|
| 2007/0058265 A1 | 3/2007 | Nishimura |
| 2007/0121215 A1 | 5/2007 | Sekita |
| 2007/0201143 A1 | 8/2007 | Kohno et al. |
| 2008/0174881 A1 | 7/2008 | Nishimura |
| 2010/0172030 A1* | 7/2010 | Yamano ................ 359/686 |
| 2011/0157715 A1* | 6/2011 | Ito ........................ 359/682 |
| 2012/0013994 A1* | 1/2012 | Tashiro .................. 359/686 |
| 2012/0188436 A1 | 7/2012 | Ozaki |
| 2013/0141616 A1 | 6/2013 | Imaoka |

FOREIGN PATENT DOCUMENTS

| | | |
|---|---|---|
| JP | 2003-131130 A | 5/2003 |
| JP | 2007-078834 A | 3/2007 |
| JP | 2007-155836 A | 6/2007 |
| JP | 2007-232974 A | 9/2007 |
| JP | 2008-197176 A | 8/2008 |
| JP | 2011-059497 A | 3/2011 |
| WO | 2011/145288 A1 | 11/2011 |
| WO | 2012/086153 A1 | 6/2012 |

* cited by examiner

ZOOM LENS AND IMAGE PICKUP APPARATUS HAVING THE SAME

BACKGROUND OF THE INVENTION

1. Field of the Invention

The present invention relates to a zoom lens, which is suitably used for an image pickup apparatus using a solid-state image pickup element, such as a digital still camera, a video camera, a television camera, or a surveillance camera.

2. Description of the Related Art

In a camera with interchangeable lenses, a camera having a function of displaying image data, generated by an image pickup lens and an image pickup element, on a display element (a live view function) in accordance with computerization of the image pickup element is known. In these cameras with the interchangeable lenses, a mirrorless camera that removes an optical finder using a quick return mirror, a pentaprism capable, and the like, and that is capable of confirming a shooting image using the live view function described above is known. Since this mirrorless camera removes the quick return mirror, the thickness of the camera is easily reduced and the size of entire of the camera is easily reduced.

On the other hand, an autofocus (AF) device is mounted on the camera in many cases. In a lot of cameras with the quick return mirrors, a ranging member that is used to perform an autofocus operation using a phase difference method (hereinafter, referred to as a "phase difference AF") is stored in a mirror box. However, since the mirrorless camera does not have the mirror box, there is little space for placing the ranging mirror used for the phase difference AF, and therefore it is very difficult to place the ranging member used for the phase difference AF without increasing the thickness of the camera.

When the phase difference AF of a twin-lens external method is adopted, it is difficult to perform the phase difference AF in a wide shooting range over the entirety of an object distance from an infinite object to a macro range as a zoom range from a wide angle end to a telephoto end. Therefore, as the AF of these mirrorless cameras with interchangeable lenses, a contrast detection AF in which an in-focus operation is performed based on the contrast of image data outputted from the image pickup element is adopted in many cases.

In the contrast detection AF, a focus lens unit is driven with vibration at high speed (for example, around 30 frames/sec so as not to have uncomfortable feelings during the in-focus operation) in an optical axis direction, and an in-focus position is calculated based on changes of the contrast of the image (wobbling operation). Therefore, in the image pickup lens which can handle the contrast detection AF, the focus lens unit is required to be small in size and weight.

As a zoom lens having a small-size total system and easily achieving a wide angle of view, a negative lead type zoom lens in which a lens unit having a negative refractive power is positioned at an object side is known. Furthermore, as a negative lead type zoom lens with a wide angle of view, a four-unit zoom lens that is configured by, in order from an object side to an image side, lens units having negative, positive, negative, and positive refractive powers, and that changes an interval between adjacent lens units so as to perform a zooming operation is known.

In this four-unit zoom lens, in order to realize reduction in size and weight of the focus lens unit, a four-unit zoom lens in which the focus lens unit is disposed in other than a first lens unit so as to use an inner focus method is known. U.S. Pat. No. 7,777,967 discloses a four-unit zoom lens which performs a focusing operation using a fourth lens unit. Each of Japanese Patent Laid-Open Nos. 2003-131130 and 2001-343584 discloses a four-unit zoom lens which performs the focusing operation using a third lens unit.

In the negative lead type zoom lens, when a desired zoom ratio and reduction in size of the total lens system are achieved, a retro focus type power arrangement at the wide angle end and a telephoto type power arrangement at the telephoto end are applied. Therefore, the total lens length at the wide angle end is longer than the total lens length at the telephoto end.

As a negative lead type zoom lens, in order to shorten the total lens length at the wide angle end, there is a three-unit zoom lens that is configured by lens units having negative, positive, and negative refractive powers, and that has a lens unit having a negative refractive power positioned in a final lens unit. The three-unit zoom lens has an exit pupil position of an optical system which comes close to an image plane by the effect of the negative refractive power of the final lens unit. Therefore, an incident angle of a ray onto the image pickup element is increased, and therefore a large amount of shading is generated when using an electronic image pickup element.

On the other hand, the four-unit zoom lens described above easily achieves the wide angle of view and the reduction in size of the total system, and has characteristics that has a little generation of the shading since the incident angle of the ray onto the image pickup element is decreased by the function of the positive refractive power of the fourth lens unit. However, in order to reduce the amount of the shading and perform a high-speed focusing operation using lens units of the small-size and lightweight total lens system while achieving the wide angle of view, it is important to appropriately set a refractive power (a power) of each lens unit, a lens configuration, and the like.

For example, if the lens configuration of the first lens unit or the third lens unit, the refractive power of the second, third, or fourth lens unit, or the like is not appropriately set, it is difficult to have a high optical performance over the entirety of the zoom range at the wide angle of view while achieving the reduction in size of the total system so as to perform the high-speed focusing operation.

In an interchangeable zoom lens used for the camera system with interchangeable lenses, when a lens unit disposed closest to the image side is moved during the focusing operation, an interference of an actuator that moves the lens unit disposed closest to the image side with a mount member is a problem.

SUMMARY OF THE INVENTION

The present invention provides a zoom lens with a wide angle of view having a high optical performance over an entire zoom range which easily performs a focusing operation at high speed.

A zoom lens as one aspect of the present invention is configured to change an interval between adjacent lens units during a zooming operation, and includes a first lens unit having a negative refractive power, a second lens unit having a positive refractive power, a third lens unit having a negative refractive power, and a fourth lens unit having a positive refractive power, disposed in order from an object side to an image side, and an aperture stop disposed between a lens surface closest to the object side of the second lens unit and a lens surface closest to the object side of the third lens unit, the third lens unit is moved to the image side during a focusing operation from an infinite object to a short distance object, the first lens unit is, in order from the object side to the image side, configured by at most two negative lenses and one positive lens, the third lens unit is configured by a single lens or a cemented lens, and a focal length f2 of the second lens unit, a focal length f3 of the third lens unit, a focal length f4 of the fourth lens unit, and a combined focal length f3Rw of the third lens unit and the fourth lens unit when focusing on the infinite object at a wide angle end are appropriately set.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanying drawings. A zoom lens of the present invention is, in order from an object side to an image side, configured by a first lens unit having a negative refractive power, a second lens unit having a positive refractive power, a third lens unit having a negative refractive power, and a fourth lens unit having a positive refractive power. In addition, the zoom lens includes an aperture stop between a lens surface closest to the object side of the second lens unit and a lens surface closest to the object side of the third lens unit, and is configured to change an interval between adjacent lens units during a zooming operation. The third lens unit is moved to the image side during a focusing operation from an infinite object to a short distance object.

Figure 1:
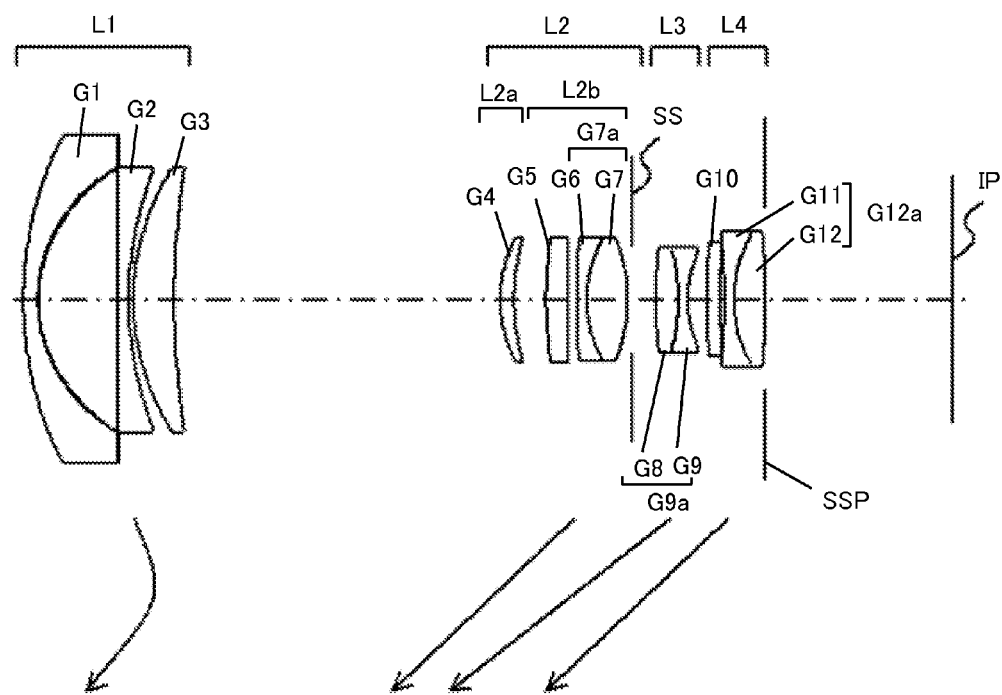
FIG. 1 is a cross-sectional diagram of a zoom lens at a wide angle end in Embodiment 1.
Figure 2A:
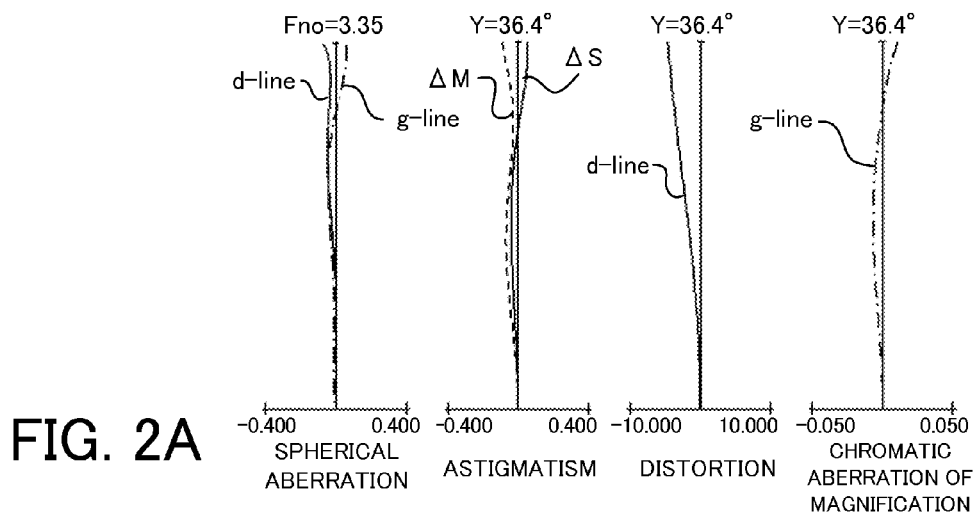
FIGS. 2A, 2B, and 2C are aberration diagrams of the zoom lens at a wide angle end, an intermediate zoom position, a telephoto end in Embodiment 1, respectively.
Figure 2B:
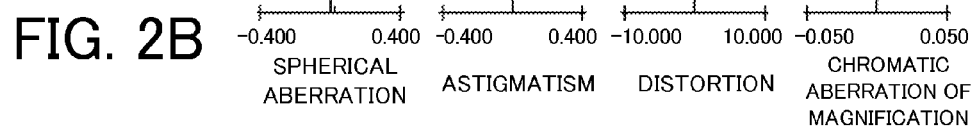
Figure 2C:
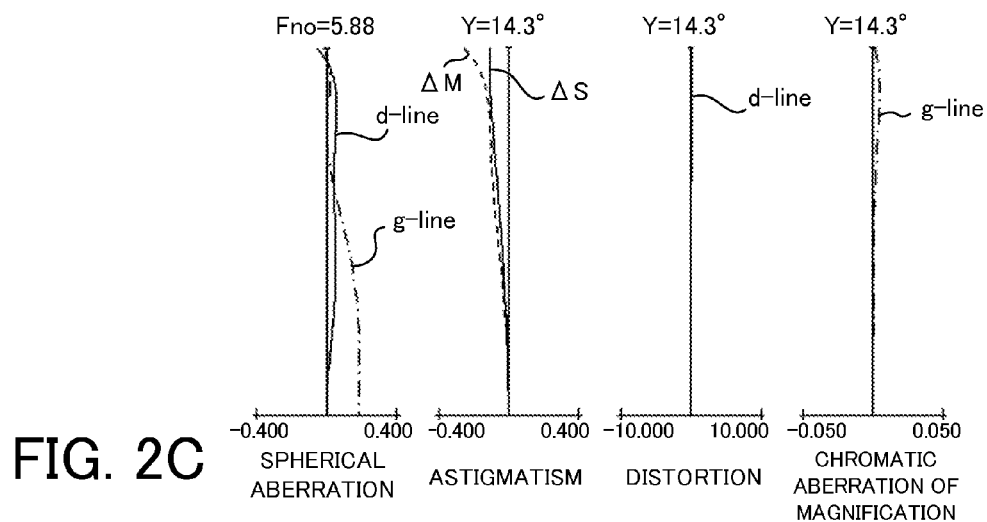

FIG. 1 is a cross-sectional diagram of a zoom lens at a wide angle end (a short focus end) in Embodiment 1 of the present invention. FIGS. 2A, 2B, and 2C are aberration diagrams of the zoom lens of Embodiment 1 at the wide angle end, an intermediate zoom position, and a telephoto end (a long focus end), respectively. The zoom lens of Embodiment 1 has a zoom ratio of 2.88, a shooting angle of view of 72.9 degrees at the wide angle end, and an F-number of 3.35 to 5.98.

Figure 3:
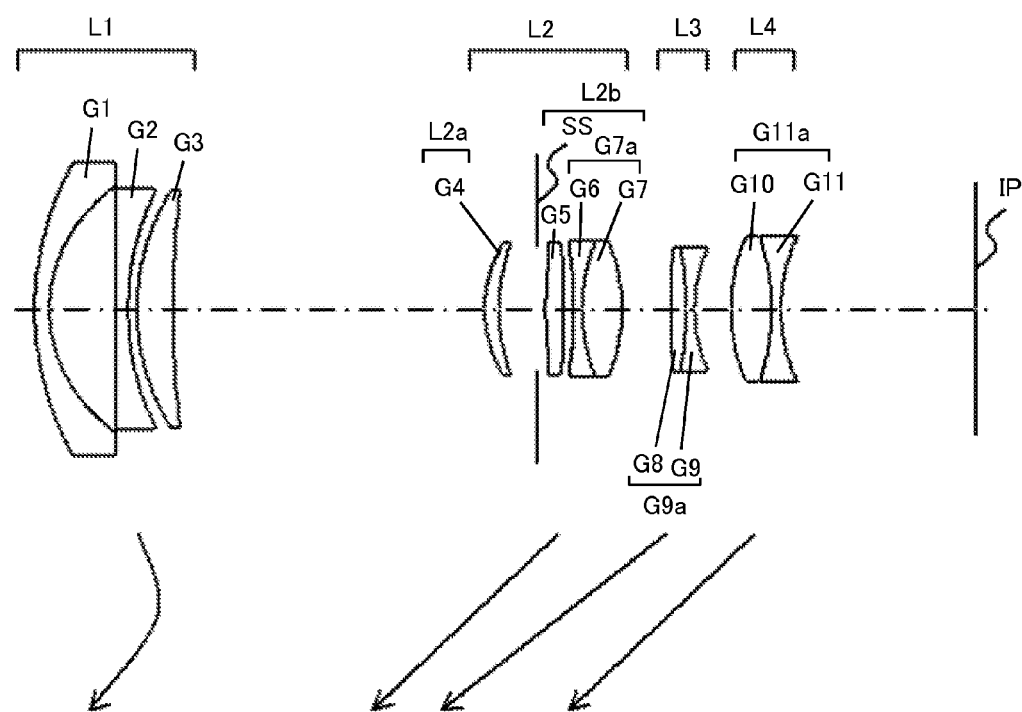
FIG. 3 is a cross-sectional diagram of a zoom lens at a wide angle end in Embodiment 2.
Figure 4A:
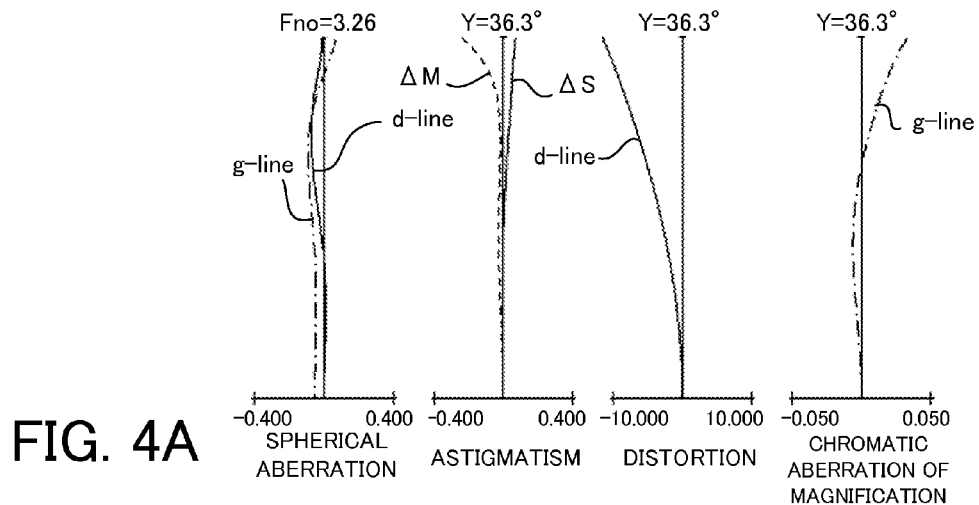
FIGS. 4A, 4B, and 4C are aberration diagrams of the zoom lens at a wide angle end, an intermediate zoom position, a telephoto end in Embodiment 2, respectively.
Figure 4B:
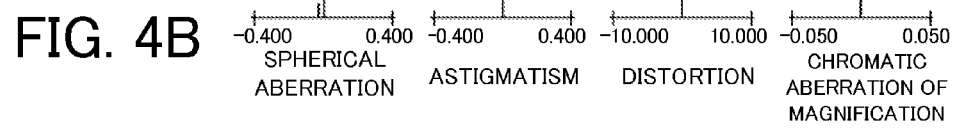
Figure 4C:
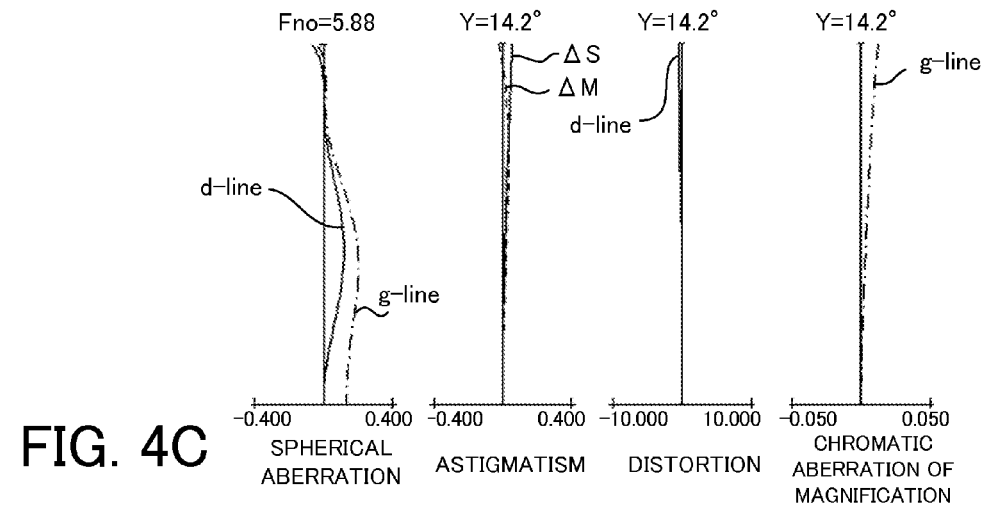

FIG. 3 is a cross-sectional diagram of a zoom lens at the wide angle end in Embodiment 2 of the present invention. FIGS. 4A, 4B, and 4C are aberration diagrams of the zoom lens of Embodiment 2 at the wide angle end, the intermediate zoom position, and the telephoto end, respectively. The zoom lens of Embodiment 2 has a zoom ratio of 2.90, a shooting angle of view of 72.6 degrees at the wide angle end, and an F-number of 3.26 to 5.88.

Figure 5:
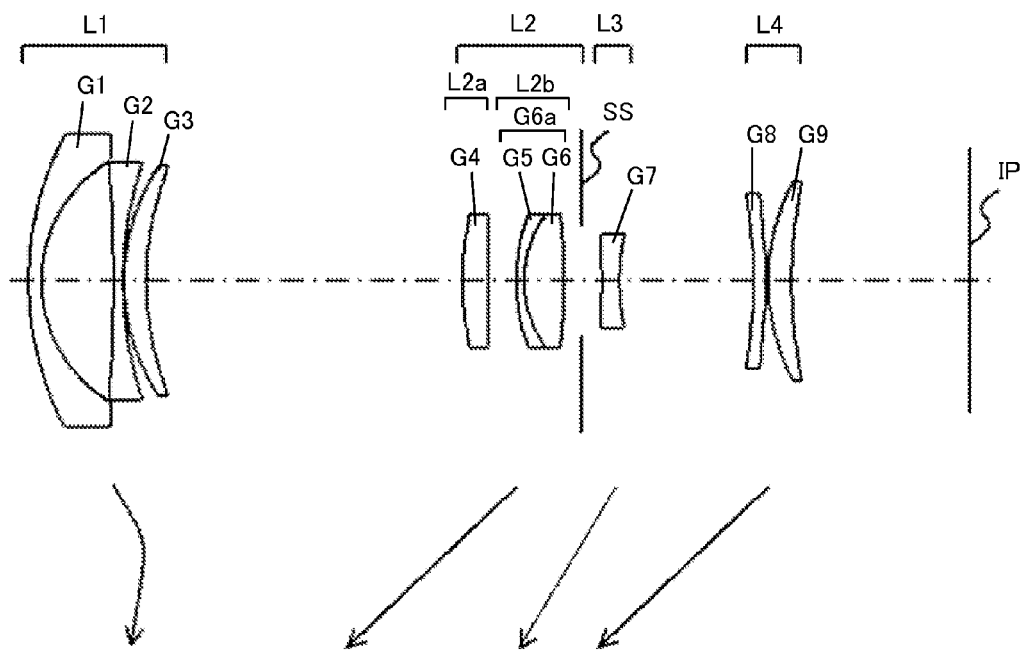
FIG. 5 is a cross-sectional diagram of a zoom lens at a wide angle end in Embodiment 3.
Figure 6A:
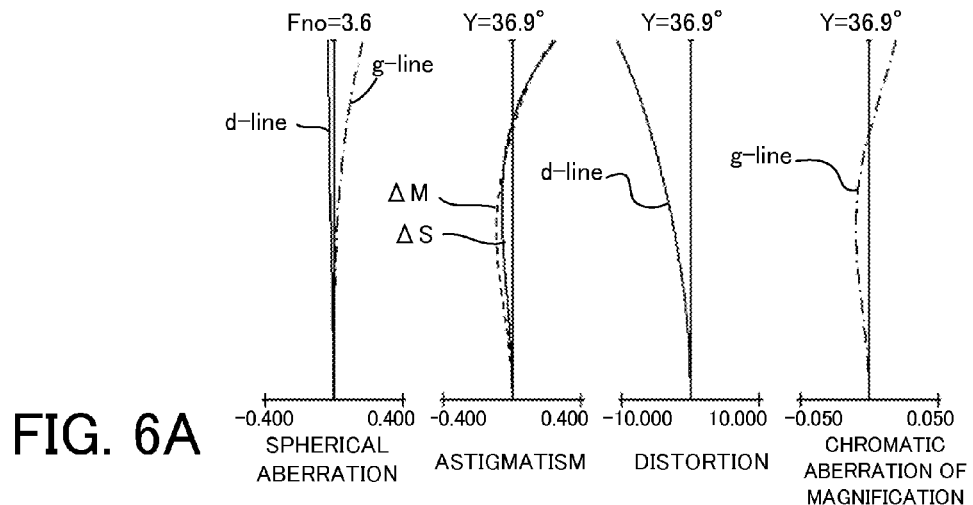
FIGS. 6A, 6B, and 6C are aberration diagrams of the zoom lens at a wide angle end, an intermediate zoom position, a telephoto end in Embodiment 3, respectively.
Figure 6B:
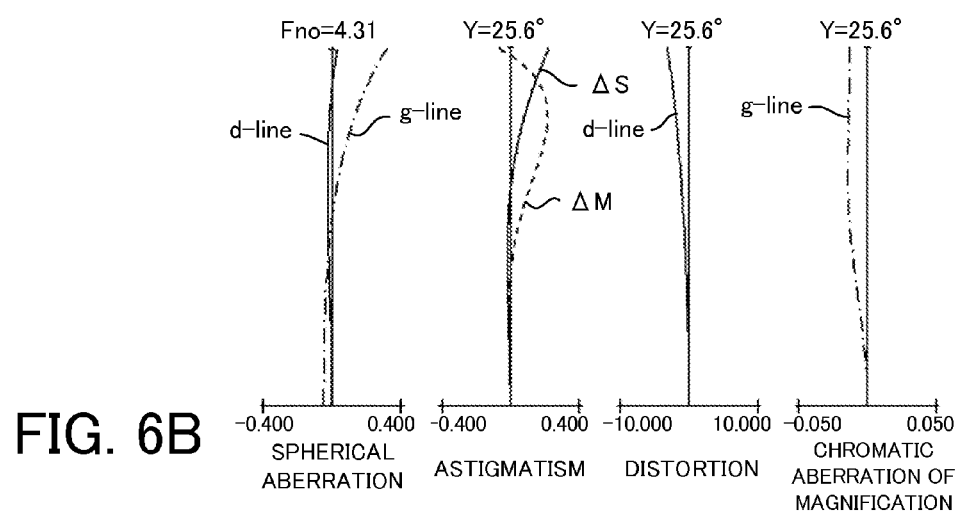
Figure 6C:
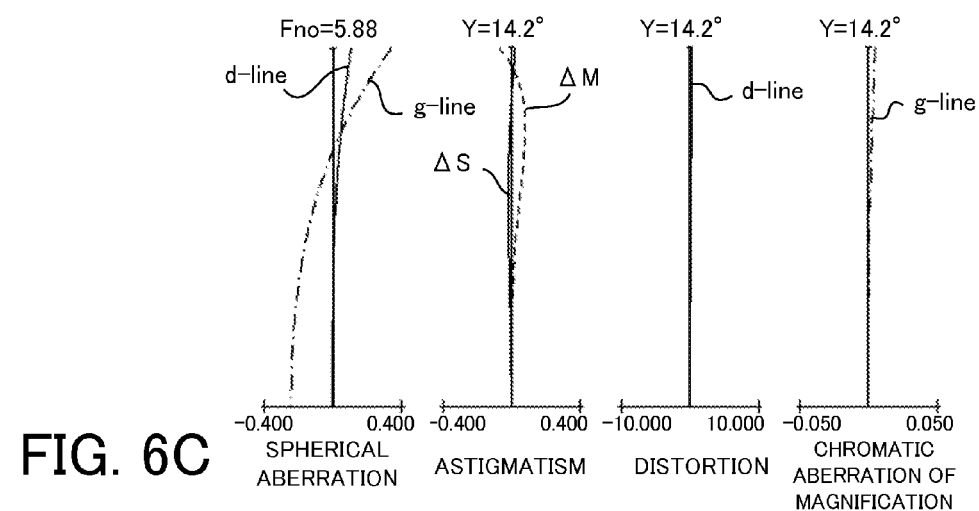

FIG. 5 is a cross-sectional diagram of a zoom lens at the wide angle end in Embodiment 3 of the present invention. FIGS. 6A, 6B, and 6C are aberration diagrams of the zoom lens of Embodiment 3 at the wide angle end, the intermediate zoom position, and the telephoto end, respectively. The zoom lens of Embodiment 3 has a zoom ratio of 2.95, a shooting angle of view of 73.8 degrees at the wide angle end, and an F-number of 3.60 to 5.88.

Figure 7:
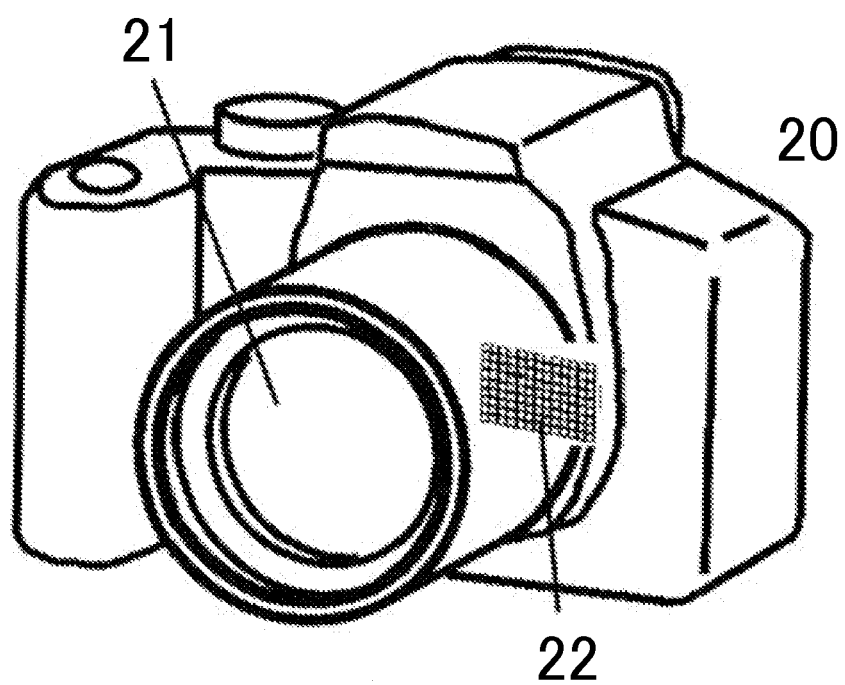
FIG. 7 is a schematic diagram of a main part of a camera (an image pickup apparatus) having the zoom lens of the present invention.

FIG. 7 is a schematic diagram of a main part of a camera (an image pickup apparatus) having the zoom lens of the present invention. The zoom lens of each embodiment is an image pickup lens system that is used for an image pickup apparatus such as a video camera, a digital camera, or a silver-salt film camera.

In the cross-sectional diagrams, the left side indicates the object side (a front side) and the right side indicates the image side (a rear side). In the cross-sectional diagrams, reference symbol i denotes an order of a lens unit counted from the object side, and reference symbol Li denotes an i-th lens unit. Reference symbol SS denotes an aperture stop. In FIG. 1, reference symbol SSP denotes a design dummy plane. Reference symbol IP denotes an image plane. The image plane IP corresponds to an imaging surface of a solid-state image pickup element (a photoelectric conversion element) such as a CCD sensor or a CMOS sensor when the zoom lens is used as an image pickup optical system of the digital still camera, the video camera, or the surveillance camera. It corresponds to a film surface when the zoom lens is used as an image pickup optical system of the silver-salt film camera.

Each arrow indicates a moving locus of each lens unit during a magnification varying operation from the wide angle end to the telephoto end. In the aberration diagrams, reference symbols d (d-line) and g (g-line) denote d-line and g-line respectively, and reference symbols ΔM and ΔS denote a meridional image plane and a sagittal image plane respectively. A chromatic aberration of magnification is indicated by the g-line. Reference symbol ω denotes a half angle of view, and reference symbol Fno denotes an F-number. In each embodiment, the wide angle end and the telephoto end mean zoom positions when a magnification varying lens unit is positioned at both ends in a mechanically movable range on the optical axis.

In each embodiment, the zoom lens includes, in order from the object side to the image side, a first lens unit L1 having a negative refractive power, a second lens unit L2 having a positive refractive power, a third lens unit L3 having a negative refractive power, and a fourth lens unit L4 having a positive refractive power. In addition, the zoom lens unit includes an aperture stop SS between a lens surface at the object side of the second lens unit L2 and a lens surface at the image side of the third lens unit L3. When performing the zooming operation, the interval between the adjacent lens units is changed. The first lens unit L1 is, in order from the object side to the image side, configured by one or two negative lenses and one positive lens.

The third lens unit L3 is configured by one lens component that is constituted of a single lens or a cemented lens formed by cementing at least two lenses, which moves to the image side during the focusing operation from the infinite object to the short distance object. The second lens unit L2 is, in order from the object side to the image side, configured by a partial lens unit L2a (a first partial lens unit) that is constituted of a single positive lens or a cemented lens having a positive refractive power, and a partial lens unit L2b (a second partial lens unit) that is constituted of at least one positive lens and at least one negative lens and that has a positive refractive power. The partial lens unit L2a or the partial lens unit L2b is moved to have a component of a direction perpendicular to an optical axis so as to move an imaging position in the direction perpendicular to the optical axis.

In each embodiment, a focal length of the second lens unit L2 is denoted by f2, a focal length of the third lens unit L3 is denoted by f3, and a focal length of the fourth lens unit L4 is denoted by f4. A combined focal length of the third lens unit L3 and the fourth lens unit L4 when focusing on the infinite object at the wide angle end is denoted by f3Rw. In this case, the following conditional expressions are met.

$$-0.70 < f2/f3Rw < -0.23 \quad (1)$$

$$0.17 < |f3|/f4 < 0.60 \quad (2)$$

When viewing a total optical system as a zoom lens having three lens units of a negative unit front type in which a lens unit having a negative refractive power is disposed at the front, at the wide angle end, the refractive power of each lens unit is set so as to have negative, positive, and negative refractive power arrangements as the total optical system. As a result, a total lens length (a distance from a first lens surface to the image plane) at the wide angle end is shortened, and a reduction in size of the total system is achieved. In addition, since the position of the aperture stop SS is disposed between a surface at the object side of the second lens unit L2 and a surface at the object side of the third lens unit L3, an exit pupil position at the wide angle end is controlled so as not to come too close to the image plane, and telecentricity is ensured in a range that can be handled by an electronic image pickup element (the solid-state image pickup element).

The refractive power of the fourth lens unit that is a lens unit at the image side relative to the third lens unit L3 is reduced compared to the refractive power of the third lens unit L3. As a result, the back focus is shortened and also a moving amount of the third lens unit L3 is to be an appropriate value when the focusing is performed by the third lens unit L3.

The first lens unit L1 is, in order from the object side to the image side, configured by one or two negative lenses and one positive lens so as to easily achieve the reduction in size of a front lens effective system. The third lens unit L3 that is a focus lens unit is configured by one lens component as described above so as to easily achieve the reduction in size and weight of the focus lens unit. As a result, a wobbling operation is easily performed so as to perform a high-speed focusing operation.

Conditional Expression (1) defines a range of a ratio of the focal length of the second lens unit L2 having the positive refractive power and the combined focal length of the third lens unit L3 and the fourth lens unit L4 when focusing on the infinite object at the wide angle. Conditional Expression (2) defines a range of a ratio of the focal lengths of the third lens unit L3 having the negative refractive power that is the focus lens unit and the fourth lens unit L4.

Adopting the refractive power arrangement which meets Conditional Expressions (1) and (2), the total lens length is shortened at the wide angle end, and the inner focus is easily performed by the third lens unit L3. When a value exceeds the upper limit of Conditional Expression (1), the negative refractive power of the combined lens unit that is configured by lens units at the image side relative to the second lens unit L2 becomes too weak compared to the positive refractive power of the second lens unit L2. In this case, when the focal length of the total system is constant, the telephoto ability of a partial system that is configured by the second lens unit L2 and the combined lens unit is too weak, the back focus is too long, and the size of the total lens length at the wide angle end is enlarged.

On the other hand, when the value exceeds the lower limit, the negative refractive power of the combined lens unit at the image side relative to the second lens unit L2 becomes too strong. In this case, when the focal length of the total system is constant, the telephoto ability of the partial system configured by the second lens unit L2 and the combined lens unit is too strong, and the back focus is too short. When the zoom lens is used as an interchangeable lens, it is difficult to dispose a shutter unit or the like at the image side of the lens unit closest to the image side. In addition, since the exit pupil is too close to the image plane, an incident angle of an off-axis ray onto the image pickup element is too large and the shading is generated, which is not preferable.

When a value exceeds the upper limit of Conditional Expression (2), since the refractive power of the third lens unit L3 that is the focus lens unit is reduced too much, the back focus is increased and also the moving amount for the focusing operation is increased, and therefore the size of the total lens system is enlarged. On the other hand, when the value exceeds the lower limit, since the refractive power of the third lens unit L3 that is the focus lens unit is too strong, the back focus is too short and also the aberration variation caused by the focusing operation is increased, and therefore this correction is difficult. In each embodiment, it is more preferred that numerical ranges of Conditional Expressions (1) and (2) be set as follows.

$$-0.69 < f2/f3Rw < -0.24 \quad (1a)$$

$$0.18 < |f3|/f4Rw < 0.50 \quad (2a)$$

In each embodiment, it is further preferred that numerical ranges of Conditional Expressions (1a) and (2a) be set as follows.

$$-0.68 < f2/f3Rw < -0.24 \quad (1b)$$

$$0.19 < |f3|/f4Rw < 0.45 \quad (2b)$$

As described above, in each embodiment, the refractive power and the configuration of each lens unit are appropriately arranged. As a result, a zoom lens which easily achieves the reduction in size of the total system, the application to the image pickup element, and the inner focus is obtained. In the zoom lens of each embodiment, it is more preferred that at least one of the following conditional expressions be met. According to this, an effect which corresponds to each conditional expression can be obtained.

A focal length of the first lens unit L1 is denoted by f1, and a focal length of the total system at the wide angle end is denoted by fw. Lateral magnifications of the third lens unit L3 and the fourth lens unit L4 when focusing on the infinite object at the telephoto end are denoted by β3t and β4t, respectively. An interval between the third lens unit L3 and the fourth lens unit L4 when focusing on the infinite object at the telephoto end is denoted by D34t. A focal length of the partial lens unit L2a is denoted by f2a. In this case, it is preferred that at least one of the following conditional expressions be met.

$$1.1 < |f1|/fw < 2.4 \quad (3)$$

$$0.8 < f2/fw < 1.5 \quad (4)$$

$$1.0 < |f3|/fw < 2.0 \quad (5)$$

$$2.8 < f4/fw < 6.2 \quad (6)$$

$$-12.0 < (1-\beta 3t^2)*\beta 4t^2 < -3.5 \quad (7)$$

$$0.1 < D34t/fw < 1.0 \quad (8)$$

$$2.0 < f2a/f2 < 5.0 \quad (9)$$

Next, a technical meaning of each conditional expression will be described. Conditional Expression (3) defines the refractive power of the first lens unit L1. When a value exceeds the upper limit of Conditional Expression (3), the refractive power of the first lens unit L1 becomes too weak, and therefore the sizes of the total lens length and the front lens effective system are enlarged. On the other hand, when the value exceeds the lower limit, the refractive power of the first lens unit L1 becomes too strong, and therefore the field curvature at the wide angle end is increased and this correction is difficult.

Conditional Expression (4) defines the refractive power of the second lens unit L2. When a value exceeds the upper limit of Conditional Expression (4), the refractive power of the second lens unit L2 becomes too weak, and therefore the moving amount of the second lens unit L2 to perform the magnification varying operation is increased and the size of the total lens length is increased. On the other hand, when the value exceeds the lower limit, the refractive power of the second lens unit L2 becomes too strong, and therefore the variations of the spherical aberration and the coma aberration caused by the magnification varying operation are increased and these corrections are difficult.

Conditional Expression (5) defines the refractive power of the third lens unit L3. When a value exceeds the upper limit of Conditional Expression (5), the refractive power of the third lens unit L3 becomes too weak, and therefore the back focus is increased and also the moving amount of performing the focusing operation is increased, and the size of the total optical system is enlarged. On the other hand, when the value exceeds the lower limit, the refractive power of the third lens unit L3 becomes too strong, and therefore the back focus is too short and the aberration variation caused by the focusing operation is increased.

Conditional Expression (6) defines the refractive power of the fourth lens unit L4. When a value exceeds the upper limit of Conditional Expression (6), the refractive power of the fourth lens unit L4 becomes too weak, and therefore the back focus is too short and the exit pupil position is too close to the image plane so that the incident angle of the off-axis ray onto the image pickup element is too large. On the other hand, when the value exceeds the lower limit, the positive refractive power of the fourth lens unit L4 becomes too strong, and therefore the back focus is increased and the size of the total lens length at the wide angle end is increased, which is not preferable.

Conditional Expression (7) defines lateral magnifications of the third lens unit L3 and the fourth lens unit L4 when focusing on the infinite object at the telephoto end and defines a focus sensitivity of the third lens unit L3 at the telephoto end. When a value exceeds the upper limit of Conditional Expression (7), the focus sensitivity of the third lens unit L3 at the telephoto end becomes too high, and therefore it is difficult to control the focusing at the wide angle end and the telephoto end. On the other hand, when the value exceeds the lower limit, the focus sensitivity of the third lens unit L3 at the telephoto end becomes too low, and therefore the moving amount by the focusing is enlarged and the size of the total system is increased, which is not preferable.

Conditional Expression (8) defines an air gap between the third lens unit L3 and the fourth lens unit L4 when focusing on the infinite object at the telephoto end. When a value exceeds the upper limit of Conditional Expression (8), the air gap between the third lens unit L3 and the fourth lens unit L4 is too wide, and therefore the size of the optical system is increased. On the other hand, when the value exceeds the lower limit, the air gap between the third lens unit L3 and the fourth lens unit L4 is too narrow, and therefore it is difficult to ensure a moving range of the focusing, which is not preferable.

In each embodiment, the second lens unit L2 is configured by the partial lens unit L2a and the partial lens unit L2b, and the partial lens unit L2a is shifted so as to have a component of a direction perpendicular to the optical axis to perform a hand-shake correction (image stabilizing operation).

Conditional Expression (9) defines a ratio of the focal lengths of the partial lens unit L2a for the image stabilizing operation and the second lens unit L2. When a value exceeds the upper limit of Conditional Expression (9), the refractive power of the partial lens unit L2a is too weak and a vibration amount of performing the image stabilizing operation is increased due to the deterioration of an image stabilizing sensitivity, and therefore the size of a drive system, especially a lens diameter, is enlarged. On the other hand, when the value exceeds the lower limit, the refractive power of the partial lens unit L2a is too strong and large amounts of a chromatic aberration of eccentric magnification, an eccentric coma aberration, and the like are generated during the image stabilizing operation, and therefore these corrections are difficult. In each embodiment, it is more preferred that the numerical ranges of Conditional Expressions (3) to (9) be set to the following ranges.

$$1.2 < |f1|/fw < 2.3 \quad (3a)$$

$$0.85 < f2/fw < 1.40 \quad (4a)$$

$$1.05 < |f3|/fw < 1.95 \quad (5a)$$

$$3.0 < f4/fw < 6.0 \quad (6a)$$

$$-11.0 < (1-\beta 3t^2)*\beta 4t^2 < -3.8 \quad (7a)$$

$$0.13 < D34t/fw < 0.80 \quad (8a)$$

$$2.1 < f2a/f2 < 4.8 \quad (9a)$$

In each embodiment, it is further preferred that the numerical ranges of Conditional Expressions (3a) to (9a) be set to the following ranges.

$$1.3 < |f1|/fw < 2.2 \quad (3b)$$

$$0.9 < f2/fw < 1.3 \quad (4b)$$

$$1.1 < |f3|/fw < 1.9 \quad (5b)$$

$$3.2 < f4/fw < 5.8 \quad (6b)$$

$$-10.0 < (1-\beta 3t^2)*\beta 4t^2 < -4.0 \quad (7b)$$

$$0.15 < D34t/fw < 0.60 \quad (8b)$$

$$2.2 < f2a/f2 < 4.5 \quad (9b)$$

In each embodiment, the second lens unit L2 and the fourth lens unit L4 are moved along the same locus during the zooming operation. According to this configuration, the second lens unit L2 and the fourth lens unit L4 can be built into the same lens barrel, and the simplification of a mechanical structure and highly accurate keeping of the gap between the lens units are easily achieved.

As described above, according to each embodiment, a zoom lens that reduces the size of the total lens system, is appropriately applied to the electronic image pickup element, and performs the inner focus operation can be obtained. Next, the lens configuration of each embodiment will be described.

Embodiment 1

Embodiment 1 described with reference to FIG. 1 is directed to a four-unit zoom lens that has, in order from the object side to the image side, the first lens unit L1 to the fourth lens unit L4 having negative, positive, negative, and positive refractive powers, respectively.

When the zooming operation from the wide angle end to the telephoto end is performed, the first lens unit L1 is moved along a locus convex towards the image side as indicated by an arrow so as to compensate the variation of the image plane caused by the magnification varying operation. The second lens unit L2, the third lens unit L3, and the fourth lens unit L4 are lens units for the magnification varying operation, each of which is moved to the object side. The aperture stop SS is disposed at the image side of the second lens unit L2, which is moved integrally with the second lens unit L2. The second lens unit L2 and the fourth lens unit L4 are integrally moved along the same locus. Each lens unit is, in order from the object side to the image side, configured as follows.

The first lens unit L1 has a compound aspherical surface at the image side, and is configured by a negative lens G1 having a convex meniscus surface at the object side, a negative lens G2 having a biconcave shape, and a positive lens G3 having a convex meniscus surface at the object side. The second lens unit L2 is configured by a positive lens G4 having a convex meniscus surface at the object side, a positive lens G5 having both aspherical surfaces and having a biconvex shape, a cemented lens G7a formed by cementing a negative lens G6 having a concave meniscus surface at the image side and a positive lens G7 having a biconvex shape, and an aperture stop SS. The third lens unit L3 is configured by a cemented lens G9a formed by cementing a positive lens G8 having a biconvex shape and a negative lens G9 having a biconcave shape.

The fourth lens unit L4 is configured by a positive lens G10 having an aspherical surface at the image side and having a convex meniscus surface at the object side and a cemented lens G12a formed by cementing a negative lens G11 having a biconcave shape and a positive lens G12 having a biconvex shape. As an in-focus operation (the focusing operation) from the infinite object to the finite distance object, an inner focus method in which the third lens unit L3 is moved to the image side on the optical axis is adopted.

In Embodiment 1, the refractive power arrangement that meets Conditional Expressions (1) and (2) and the position of the aperture stop SS are appropriately set. In addition, since the third lens unit L3 is configured by one cemented lens G9a, the reduction in size of the total lens system, the application to the electronic image pickup element, the inner focusing operation, and the reduction in weight of the focus lens unit are achieved.

Embodiment 2

A zoom lens of Embodiment 2 described with reference to in FIG. 3 has the same zoom type and focus method as those of Embodiment 1. On the other hand, the refractive power arrangement and the lens configuration in the lens units are different from those of Embodiment 1. In Embodiment 2, the aperture stop SS is disposed in the second lens unit L2, which is moved integrally with the second lens unit L2 during the zooming operation. Each lens unit is, in order from the object side to the image side, configured as follows.

The first lens unit L1 is configured by a negative lens G1 having a convex meniscus surface at the object side, a negative lens G2 having a biconcave shape, and a positive lens G3 having a convex meniscus surface at the object side. The second lens unit L2 is configured by a positive lens G4 having a convex meniscus surface at the object side, an aperture stop SS, a positive lens G5 having both aspherical surfaces and having a biconvex shape, and a cemented lens G7a formed by cementing a negative lens G6 having a biconcave shape and a positive lens G7 having a biconvex shape. The third lens unit L3 is configured by a cemented lens G9a formed by cementing a positive lens G8 having a biconvex shape and a negative lens G9 having a biconcave shape. The fourth lens unit L4 is configured by a cemented lens G11a formed by cementing a positive lens G10 having a biconvex shape and a negative lens G11 having a biconcave shape.

Embodiment 3

A zoom lens of Embodiment 3 described with reference to in FIG. 5 has the same zoom type and focus method as those of Embodiment 1. On the other hand, the refractive power arrangement and the lens configuration in the lens units are different from those of Embodiment 1. Each lens unit is, in order from the object side to the image side, configured as follows.

The first lens unit L1 is configured by a negative lens G1 having a convex meniscus surface at the object side, a negative lens G2 having a biconcave shape, and a positive lens G3 having a convex meniscus surface at the object side. The second lens unit L2 is configured by a positive lens G4 having an aspherical and convex meniscus surface at the object side and a cemented lens G6a formed by cementing a negative lens G5 having a convex and negative meniscus surface at the object side and a positive lens G6 having a biconvex shape.

The third lens unit L3 is configured by a negative lens G7 having an aspherical surface at the object side and having a biconcave shape. The fourth lens unit L4 is configured by a positive lens G8 having an aspherical surface at the image side and having a concave meniscus surface at the object side and a positive lens G9 having a convex meniscus surface at the object side. In Embodiment 3, since the refractive power arrangement that meets Conditional Expressions (1) and (2) and the position of the aperture stop SS are appropriately set and the third lens unit L3 is configured by a single lens, the reduction in size of the total lens system, the application to the electronic image pickup element, the inner focusing operation, and the reduction in weight of the focus lens unit are achieved.

Hereinafter, specific numerical data of Numerical Examples 1 to 3 that correspond to Embodiments 1 to 3, respectively, are indicated. In each numerical examples, symbol i denotes an order of a surface counted from the object side, symbol ri denotes a radius of curvature of the i-th optical surface (the i-th surface), symbol di denotes an axial interval between the i-th surface and the (i+1)-th surface, and symbols ndi and vdi denote a refractive index and Abbe number of the material of the i-th optical member with respect to the d-line, respectively. Number 1 of the surface number in Numerical example 2 denotes a design dummy plane. Symbol Fno denotes an F-number, and symbol ω denotes a half angle of view. Symbol BF denotes a back focus.

An aspherical surface shape is represented by the following expression, where a traveling direction of light is positive, symbol X denotes a displacement in an optical axis direction from an apex of a surface, symbol h denotes a height from the optical axis in a direction perpendicular to the optical axis, symbol r denotes a paraxial radius of curvature, symbol K denotes a conic constant, and symbols A4, A6, A8, and A10 denote aspherical coefficients.

$$x=(h^2/r)/[1+\{1-(1+K)\times(h/r)^2\}^{1/2}]+A4\times h^4+A6\times h^6+A8\times h^8+A10\times h^{10}+A12\times h^{12} \quad (10)$$

The description of "E±XX" means "×10$^{\pm XX}$". Table 1 indicates a relationship between each conditional expression described above and the numerical examples. The description of "e±XX" in numerical values means "×10$^{\pm XX}$".

Numerical Example 1

Unit mm

Surface data

| Surface Number | r | d | nd | vd | Effective diameter |
|---|---|---|---|---|---|
| 1 | 40.021 | 1.60 | 1.90366 | 31.3 | 34.92 |
| 2 | 16.547 | 0.05 | 1.58306 | 30.2 | 28.13 |
| 3* | 15.350 | 8.75 | | | 28.11 |
| 4 | −767.469 | 1.20 | 1.60311 | 60.6 | 27.92 |
| 5 | 39.369 | 0.50 | | | 27.43 |
| 6 | 26.962 | 4.50 | 1.84666 | 23.9 | 27.91 |
| 7 | 92.015 | (variable) | | | 27.25 |
| 8 | 15.398 | 1.50 | 1.48749 | 70.2 | 12.79 |
| 9 | 25.036 | 3.50 | | | 12.66 |
| 10* | 30.259 | 2.50 | 1.58313 | 59.4 | 12.77 |
| 11* | −384.617 | 1.00 | | | 12.79 |
| 12 | 936.559 | 1.00 | 1.80610 | 33.3 | 12.68 |
| 13 | 13.831 | 4.50 | 1.68980 | 62.7 | 12.53 |
| 14 | −18.019 | 0.50 | | | 12.54 |
| 15 (stop) | ∞ | (variable) | | | 11.65 |
| 16 | 47.057 | 2.50 | 1.84666 | 23.9 | 10.69 |
| 17 | −20.785 | 1.00 | 1.86482 | 45.2 | 10.06 |
| 18 | 12.673 | (variable) | | | 9.80 |
| 19 | 82.421 | 1.50 | 1.52996 | 55.8 | 10.96 |
| 20* | 132.640 | 0.50 | | | 11.66 |
| 21 | −59.172 | 1.00 | 1.69198 | 28.2 | 11.76 |
| 22 | 14.508 | 3.50 | 1.80052 | 49.3 | 13.38 |
| 23 | −71.243 | (variable) | | | 14.04 |
| 24 | ∞ | 20.56 | | | 20.02 |
| Image plane | ∞ | | | | |

Aspherical surface data

Third surface

K = −3.31777e−001    A4 = 2.01452e−006    A6 = 6.77677e−010
A8 = 2.59096e−011    A10 = −2.53750e−013

Tenth surface

K = 4.83732e+000    A4 = −1.27633e−004    A6 = −3.56885e−007
A8 = −2.74186e−008    A10 = −3.35246e−011    A12 = 3.75036e−012

Eleventh surface

K = −3.27806e+003    A4 = −1.04354e−005    A6 = −3.24425e−008
A8 = −3.55228e−008    A10 = 2.46465e−010    A12 = 1.36015e−012

Twentieth surface

K = −6.89688e+002    A4 = 5.60844e−006    A6 = −4.92965e−007
A8 = −4.03877e−009    A10 = 1.14547e−010

Various kinds of data
Zoom ratio 2.88

| | Wide angle | Intermediate | Telephoto |
|---|---|---|---|
| Focal length | 18.50 | 36.02 | 53.33 |
| F-number | 3.35 | 4.57 | 5.98 |
| Angle of view | 36.44 | 20.77 | 14.37 |
| Image height | 13.66 | 13.66 | 13.66 |
| Total lens length | 102.26 | 88.87 | 97.58 |
| BF | 20.56 | 20.56 | 20.56 |

-continued

Unit mm

Focusing on infinite object

| d7 | 35.92 | 8.38 | 0.33 |
|---|---|---|---|
| d15 | 2.60 | 2.10 | 1.23 |
| d18 | 2.09 | 2.58 | 3.45 |
| d23 | 0.00 | 14.15 | 30.91 |

Focusing on object at distance of 1 m from image plane

| d7 | 35.92 | 8.38 | 0.33 |
|---|---|---|---|
| d15 | 2.70 | 2.33 | 1.55 |
| d18 | 1.98 | 2.35 | 3.13 |
| d23 | 0.00 | 14.15 | 30.91 |
| Entrance pupil position | 23.96 | 18.56 | 16.16 |
| Exit pupil position | −10.62 | −24.99 | −42.09 |
| Front side principal point position | 31.49 | 26.10 | 24.09 |
| Rear side principal point position | 2.06 | −15.46 | −32.77 |

Zoom lens unit data

| Unit | Start Surface | Focal length | Lens configuration length | Front side principal point position | Rear side principal point position |
|---|---|---|---|---|---|
| L1 | 1 | −39.34 | 16.60 | −0.45 | −14.18 |
| L2 | 8 | 18.29 | 14.50 | 7.44 | −4.95 |
| L3 | 16 | −20.49 | 3.50 | 2.67 | 0.69 |
| L4 | 19 | 104.51 | 6.50 | 4.16 | 0.12 |
| FC | 24 | ∞ | 0.00 | 0.00 | −0.00 |

Single lens data

| Lens | Start Surface | Focal length |
|---|---|---|
| G1 | 1 | −32.26 |
| G1 | 2 | −369.58 |
| G2 | 4 | −62.06 |
| G3 | 6 | 43.66 |
| G4 | 8 | 78.07 |
| G5 | 10 | 48.21 |
| G6 | 12 | −17.42 |
| G7 | 13 | 12.04 |
| G8 | 16 | 17.32 |
| G9 | 17 | −8.98 |
| G10 | 19 | 406.56 |
| G11 | 21 | −16.74 |
| G12 | 22 | 15.34 |

Numerical Example 2

Unit mm

Surface data

| Surface Number | r | d | nd | vd | Effective diameter |
|---|---|---|---|---|---|
| 1 | ∞ | 2.50 | | | 999.00 |
| 2 | 32.389 | 1.60 | 1.91082 | 35.3 | 30.24 |
| 3 | 15.821 | 7.22 | | | 25.08 |
| 4 | −8566.340 | 1.20 | 1.83481 | 42.7 | 24.64 |
| 5 | 28.799 | 1.00 | | | 23.78 |
| 6 | 24.252 | 3.90 | 1.84666 | 23.9 | 24.39 |
| 7 | 114.314 | (variable) | | | 23.96 |
| 8 | 13.986 | 1.56 | 1.48749 | 70.2 | 13.24 |
| 9 | 21.485 | 4.00 | | | 13.07 |
| 10 (stop) | ∞ | 1.00 | | | 13.21 |
| 11* | 34.559 | 1.96 | 1.58313 | 59.4 | 13.26 |
| 12* | −234.073 | 1.00 | | | 13.37 |
| 13 | −62.991 | 1.00 | 1.84666 | 23.9 | 13.29 |
| 14 | 20.007 | 4.26 | 1.72342 | 38.0 | 13.41 |
| 15 | −19.370 | (variable) | | | 13.61 |

-continued

Unit mm

| | | | | | |
|---|---|---|---|---|---|
| 16 | 129.521 | 1.59 | 1.92286 | 20.9 | 12.40 |
| 17 | −37.438 | 1.00 | 1.72342 | 38.0 | 12.17 |
| 18 | 17.445 | (variable) | | | 12.08 |
| 19 | 19.603 | 4.40 | 1.69680 | 55.5 | 14.88 |
| 20 | −23.252 | 1.00 | 1.60342 | 38.0 | 14.90 |
| 21 | 18.262 | (variable) | | | 14.79 |
| Image plane | ∞ | | | | |

Aspherical surface data

Eleventh surface

K = 1.05166e+000   A4 = −1.15232e−004   A6 = −8.72019e−007
A8 = −2.52400e−008   A10 = 1.76995e−010   A12 = 7.57582e−013

Twelfth surface

K = −3.51607e+003   A4 = −6.03318e−005   A6 = −2.89476e−007
A8 = −2.78464e−008   A10 = 2.32353e−010   A12 = 3.41924e−013

Various kinds of data
Zoom ratio 2.90

| | Wide angle | Intermediate | Telephoto |
|---|---|---|---|
| Focal length | 18.58 | 35.72 | 53.80 |
| F-number | 3.26 | 4.53 | 5.88 |
| Angle of view | 36.32 | 20.93 | 14.25 |
| Image height | 13.66 | 13.66 | 13.66 |
| Total lens length | 103.83 | 98.31 | 109.07 |
| BF | 20.94 | 37.91 | 56.94 |

Focusing on infinite object

| | | | |
|---|---|---|---|
| d7 | 33.55 | 11.06 | 2.80 |
| d15 | 5.30 | 3.32 | 1.80 |
| d18 | 3.84 | 5.83 | 7.35 |
| d21 | 20.94 | 37.91 | 56.94 |

Focusing on object at distance of 1 m from image plane

| | | | |
|---|---|---|---|
| d7 | 33.55 | 11.06 | 2.80 |
| d15 | 5.52 | 3.75 | 2.46 |
| d18 | 3.63 | 5.39 | 6.69 |
| d21 | 20.94 | 37.91 | 56.94 |
| Entrance pupil position | 24.50 | 19.27 | 16.25 |
| Exit pupil position | −16.20 | −17.27 | −18.04 |
| Front side principal point position | 33.78 | 31.87 | 31.45 |
| Rear side principal point position | 2.36 | 2.20 | 3.14 |

Zoom lens unit data

| Unit | Start Surface | Focal length | Lens configuration length | Front side principal point position | Rear side principal point position |
|---|---|---|---|---|---|
| L1 | 1 | −35.03 | 17.42 | 3.94 | −10.53 |
| L2 | 8 | 23.00 | 14.78 | 8.27 | −4.87 |
| L3 | 16 | −35.08 | 2.59 | 1.89 | 0.46 |
| L4 | 19 | 100.00 | 5.40 | −9.56 | −11.66 |

Single lens data

| Lens | Start Surface | Focal length |
|---|---|---|
| G1 | 1 | −35.60 |
| G2 | 4 | −34.38 |
| G3 | 6 | 35.65 |
| G4 | 8 | 76.94 |
| G5 | 11 | 51.78 |
| G6 | 13 | −17.84 |
| G7 | 14 | 14.25 |
| G8 | 16 | 31.61 |
| G9 | 17 | −16.32 |
| G10 | 19 | 15.94 |
| G11 | 20 | −16.80 |

Numerical Example 3

Unit mm

Surface data

| Surface Number | r | d | nd | vd | Effective diameter |
|---|---|---|---|---|---|
| 1 | 32.413 | 1.30 | 1.72000 | 50.2 | 28.76 |
| 2 | 14.451 | 7.36 | | | 23.59 |
| 3 | −170.774 | 1.00 | 1.72000 | 50.2 | 23.14 |
| 4 | 38.022 | 0.10 | | | 22.42 |
| 5 | 21.514 | 2.27 | 1.92286 | 18.9 | 22.48 |
| 6 | 31.158 | (variable) | | | 21.89 |
| 7* | 30.945 | 2.67 | 1.74330 | 49.3 | 12.61 |
| 8 | 1744.885 | 2.80 | | | 12.50 |
| 9 | 19.076 | 0.80 | 1.84666 | 23.9 | 12.66 |
| 10 | 11.515 | 4.10 | 1.60311 | 60.6 | 12.24 |
| 11 | −51.101 | 1.80 | | | 11.96 |
| 12 (stop) | ∞ | (variable) | | | 11.15 |
| 13* | −99.968 | 1.80 | 1.67790 | 54.9 | 8.97 |
| 14 | 21.571 | (variable) | | | 8.34 |
| 15 | −47.215 | 1.20 | 1.58306 | 30.2 | 15.96 |
| 16* | −46.684 | 0.27 | | | 16.69 |
| 17 | 21.961 | 2.40 | 1.58267 | 46.4 | 19.07 |
| 18 | 50.717 | (variable) | | | 19.15 |
| Image plane | ∞ | | | | |

Aspherical surface data

Seventh surface

K = 0.00000e+000   A4 = −8.20445e−006   A6 = −4.85557e−008
A8 = 1.18740e−010

Thirteenth surface

K = 0.00000e+000   A4 = −3.29655e−006   A6 = 3.35387e−007
A8 = −7.73602e−010

Sixteenth surface

K = 0.00000e+000   A4 = 3.39745e−005   A6 = 2.25152e−007
A8 = −1.22872e−009   A10 = 7.03392e−012

Various kinds of data
Zoom ratio 2.95

| | Wide angle | Intermediate | Telephoto |
|---|---|---|---|
| Focal length | 18.21 | 28.48 | 53.80 |
| F-number | 3.60 | 4.31 | 5.88 |
| Angle of view | 36.88 | 25.63 | 14.25 |
| Image height | 13.66 | 13.66 | 13.66 |
| Total lens length | 96.23 | 88.65 | 90.75 |
| BF | 18.21 | 26.58 | 42.31 |

Focusing on infinite object

| | | | |
|---|---|---|---|
| d6 | 32.36 | 16.41 | 2.77 |
| d12 | 2.03 | 3.28 | 7.23 |
| d14 | 13.76 | 12.52 | 8.57 |
| d18 | 18.21 | 26.58 | 42.31 |

Focusing on object at distance of 1 m from image plane

| | | | |
|---|---|---|---|
| d6 | 32.36 | 16.41 | 2.77 |
| d12 | 2.16 | 3.54 | 7.97 |
| d14 | 13.64 | 12.26 | 7.83 |
| d18 | 18.21 | 26.58 | 42.31 |
| Entrance pupil position | 21.10 | 18.79 | 15.57 |
| Exit pupil position | −25.45 | −24.92 | −22.47 |
| Front side principal point position | 31.71 | 31.52 | 24.69 |
| Rear side principal point position | −0.00 | −1.89 | −11.49 |

Zoom lens unit data

| Unit | Start Surface | Focal length | Lens configuration length | Front side principal point position | Rear side principal point position |
|---|---|---|---|---|---|
| L1 | 1 | −25.93 | 12.03 | 3.95 | −5.38 |
| L2 | 7 | 18.54 | 12.17 | 3.25 | −6.35 |

-continued

Unit mm

| | | | | | |
|---|---|---|---|---|---|
| L3 | 13 | −26.02 | 1.80 | 0.88 | −0.19 |
| L4 | 15 | 62.85 | 3.87 | 0.51 | −1.99 |

Single lens data

| Lens | Start Surface | Focal length |
|---|---|---|
| G1 | 1 | −37.35 |
| G2 | 3 | −43.11 |
| G3 | 5 | 67.68 |
| G4 | 7 | 42.36 |
| G5 | 9 | −36.06 |
| G6 | 10 | 15.98 |
| G7 | 13 | −26.02 |
| G8 | 15 | 3886.22 |
| G9 | 17 | 64.49 |

[Table 1]

TABLE 1

| CONDITIONAL EXPRESSION | LOWER LIMIT | UPPER LIMIT | EMBODIMENTS | | |
|---|---|---|---|---|---|
| | | | 1 | 2 | 3 |
| (1) | −0.70 | −0.23 | −0.670 | −0.466 | −0.254 |
| (2) | 0.17 | 0.60 | 0.196 | 0.351 | 0.414 |
| (3) | 1.1 | 2.4 | 2.127 | 1.885 | 1.424 |
| (4) | 0.8 | 1.5 | 0.989 | 1.238 | 1.018 |
| (5) | 1.0 | 2.0 | 1.107 | 1.888 | 1.429 |
| (6) | 2.8 | 6.2 | 5.649 | 5.382 | 3.452 |
| (7) | −12.0 | −3.5 | −9.900 | −4.943 | −4.336 |
| (8) | 0.1 | 1.0 | 0.187 | 0.396 | 0.470 |
| (9) | 2.0 | 5.0 | 4.268 | 3.345 | 2.284 |

In FIG. 7, reference numeral 20 denotes a camera body, and reference numeral 21 denotes an image pickup optical system that is configured by any one of the zoom lenses described in Embodiments 1 to 3.

Reference numeral 22 denotes a solid-state image pickup element (a photoelectric conversion element) such as a CCD sensor or a CMOS sensor that is embedded in the camera body 20 and that receives light of an object image formed by the image pickup optical system 21. The zoom lens of each embodiment can be applied to a single-lens reflex camera that is provided with a quick return mirror, and can also be applied to a mirrorless single-lens-reflex camera that is not provided with the quick return mirror.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-279587, filed on Dec. 21, 2011, which is hereby incorporated by reference herein in its entirety.

What is claimed is:

1. A zoom lens which changes an interval between adjacent lens units during a zooming operation, the zoom lens comprising:
a first lens unit having a negative refractive power, a second lens unit having a positive refractive power, a third lens unit having a negative refractive power, and a fourth lens unit having a positive refractive power, disposed in order from an object side to an image side; and
an aperture stop disposed between a lens surface closest to the object side of the second lens unit and a lens surface closest to the object side of the third lens unit,
wherein the third lens unit is moved to the image side during a focusing operation from an infinite object to a short distance object,
wherein each of the lens units moves during the zooming operation so that the interval between the third lens unit and the fourth lens unit at a telephoto end is larger than that at a wide angle end,
wherein the first lens unit is, in order from the object side to the image side, configured by at most two negative lenses and one positive lens,
wherein the third lens unit is configured by a single lens or a cemented lens, and
wherein the following conditional expressions are met:

$$-0.70 < f2/f3Rw < -0.24$$

$$0.17 < |f3|/f4 < 0.60$$

$$3.2 < f4/fw < 6.2$$

where f2 is a focal length of the second lens unit, f3 is a focal length of the third lens unit, f4 is a focal length of the fourth lens unit, f3Rw is a combined focal length of the third lens unit and the fourth lens unit when focusing on the infinite object at a wide angle end, and fw is a focal length of the zoom lens at the wide angle end.

2. The zoom lens according to claim 1, wherein the following conditional expression is met:

$$1.1 < |f1|/fw < 2.4$$

where f1 is a focal length of the first lens unit.

3. The zoom lens according to claim 1, wherein the following conditional expression is met:

$$0.8 < f2/fw < 1.5.$$

4. The zoom lens according to claim 1, wherein the following conditional expression is met:

$$1.0 < |f3|/fw < 2.0.$$

5. The zoom lens according to claim 1, wherein the following conditional expression is met:

$$-12.0 < (1-\beta 3t^2)*\beta 4t^2 < -3.5$$

where β3t and β4t are lateral magnifications of the third lens unit and the fourth lens unit respectively when focusing on the infinite object at a telephoto end.

6. The zoom lens according to claim 1, wherein the following conditional expression is met:

$$0.1 < D34t/fw < 1.0$$

where D34t is an interval between the third lens unit and the fourth lens unit when focusing on the infinite object at a telephoto end.

7. The zoom lens according to claim 1, wherein the second lens unit is, in order from the object side to the image side, configured by a first partial lens unit that is constituted of a single positive lens or a cemented lens having a positive refractive power and a second partial lens unit that is constituted of at least one positive lens and at least one negative lens and that has a positive refractive power.

8. The zoom lens according to claim 7, wherein one of the first partial lens unit and the second partial lens unit is moved to have a component of a direction perpendicular to an optical axis so as to move an imaging position in the direction perpendicular to the optical axis.

9. The zoom lens according to claim 7,
wherein the first partial lens unit is moved to have a component of a direction perpendicular to an optical axis so as to move an imaging position in the direction perpendicular to the optical axis, and
wherein the following conditional expression is met:

$$2.0 < f2a/f2 < 5.0$$

where f2a is a focal length of the first partial lens unit.

10. The zoom lens according to claim 1, wherein the second lens unit and the fourth lens unit are moved along the same locus during the zooming operation.

11. The zoom lens according to claim 1, wherein the first lens unit is moved along a locus convex towards the image side, and the second lens unit, the third lens unit, and the fourth lens unit are moved to the object side during the zooming operation from the wide angle end to a telephoto end.

12. An image pickup apparatus comprising:
a zoom lens; and
an image pickup element configured to receive light of an image formed by the zoom lens,
wherein the zoom lens comprises:
(a) a first lens unit having a negative refractive power, a second lens unit having a positive refractive power, a third lens unit having a negative refractive power, and a fourth lens unit having a positive refractive power, disposed in order from an object side to an image side; and
(b) an aperture stop disposed between a lens surface closest to the object side of the second lens unit and a lens surface closest to the object side of the third lens unit,
wherein the third lens unit is moved to the image side during a focusing operation from an infinite object to a short distance object,
wherein each of the lens units moves during the zooming operation so that the interval between the third lens unit and the fourth lens unit at a telephoto end is larger than that at a wide angle end,
wherein the first lens unit is, in order from the object side to the image side, configured by at most two negative lenses and one positive lens,
wherein the third lens unit is configured by a single lens or a cemented lens, and
wherein the following conditional expressions are met:

$$-0.70 < f2/f3Rw < -0.24$$

$$0.17 < |f3|/f4 < 0.60$$

$$3.2 < f4/fw < 6.2$$

where f2 is a focal length of the second lens unit, f3 is a focal length of the third lens unit, f4 is a focal length of the fourth lens unit, f3Rw is a combined focal length of the third lens unit and the fourth lens unit when focusing on the infinite object at a wide angle end, and fw is a focal length of the zoom lens at the wide angle end.

* * * * *